(12) United States Patent
Hattori

(10) Patent No.: US 10,836,381 B2
(45) Date of Patent: Nov. 17, 2020

(54) DRIVING ASSISTANCE DEVICE

(71) Applicant: DENSO CORPORATION, Kariya (JP)

(72) Inventor: Yosuke Hattori, Kariya (JP)

(73) Assignee: DENSO CORPORATION, Kariya (JP)

( * ) Notice: Subject to any disclaimer, the term of this patent is extended or adjusted under 35 U.S.C. 154(b) by 65 days.

(21) Appl. No.: 16/076,452

(22) PCT Filed: Feb. 10, 2017

(86) PCT No.: PCT/JP2017/005008
§ 371 (c)(1),
(2) Date: Aug. 8, 2018

(87) PCT Pub. No.: WO2017/138658
PCT Pub. Date: Aug. 17, 2017

(65) Prior Publication Data
US 2019/0047552 A1 Feb. 14, 2019

(30) Foreign Application Priority Data

Feb. 10, 2016 (JP) .................. 2016-023908
Jan. 24, 2017 (JP) .................. 2017-010549

(51) Int. Cl.
*B60W 30/085* (2012.01)
*B60W 30/095* (2012.01)
(Continued)

(52) U.S. Cl.
CPC ...... *B60W 30/085* (2013.01); *B60W 30/0953* (2013.01); *B60W 30/0956* (2013.01); *G06K 9/00805* (2013.01); *G06K 9/6292* (2013.01)

(58) Field of Classification Search
CPC .......... B60W 30/085; B60W 30/0953; B60W 30/0956; G06K 9/00805; G06K 9/6292
See application file for complete search history.

(56) References Cited

U.S. PATENT DOCUMENTS 7,102,496 B1 * 9/2006 Ernst, Jr. .......... G08G 1/096725
180/167
2004/0153217 A1 * 8/2004 Mattes ............... B60K 31/0008
701/1
(Continued)

FOREIGN PATENT DOCUMENTS

JP 2004-524214 A 8/2004
JP 2006-195641 A 7/2006
(Continued)

*Primary Examiner* — Adam R Mott
(74) *Attorney, Agent, or Firm* — Maschoff Brennan

(57) ABSTRACT

A driving assistance device includes a travel information acquisition unit, a first information acquisition unit, a second information acquisition unit, a collision determination unit, a driving control unit, a presence determination unit, and an early control unit. When the presence determination unit determines that a moving object is present ahead of the own vehicle in its traveling direction in a case where the moving object is not detected by a detection device which is mounted on the own vehicle, the early control unit performs early control for advancing a timing at which the moving object is detected by the detection device and the driving control unit performs control so that the own vehicle performs avoidance driving action.

6 Claims, 5 Drawing Sheets

(51) Int. Cl.
*G06K 9/00* (2006.01)
*G06K 9/62* (2006.01)

(56) References Cited

U.S. PATENT DOCUMENTS

| | | | |
|---|---|---|---|
| 2008/0243390 A1 | 10/2008 | Nakamori | |
| 2014/0063248 A1* | 3/2014 | Sakagami | G08B 13/22 |
| | | | 348/148 |
| 2015/0019080 A1* | 1/2015 | Schneider | B60W 30/0956 |
| | | | 701/41 |

FOREIGN PATENT DOCUMENTS

| | | | |
|---|---|---|---|
| JP | 2008-181200 A | | 8/2008 |
| JP | 2008-242844 A | | 10/2008 |
| JP | 2011-253241 A | | 12/2011 |
| JP | 2014109943 A | * | 6/2014 |
| JP | 2015-097028 A | | 5/2015 |

\* cited by examiner

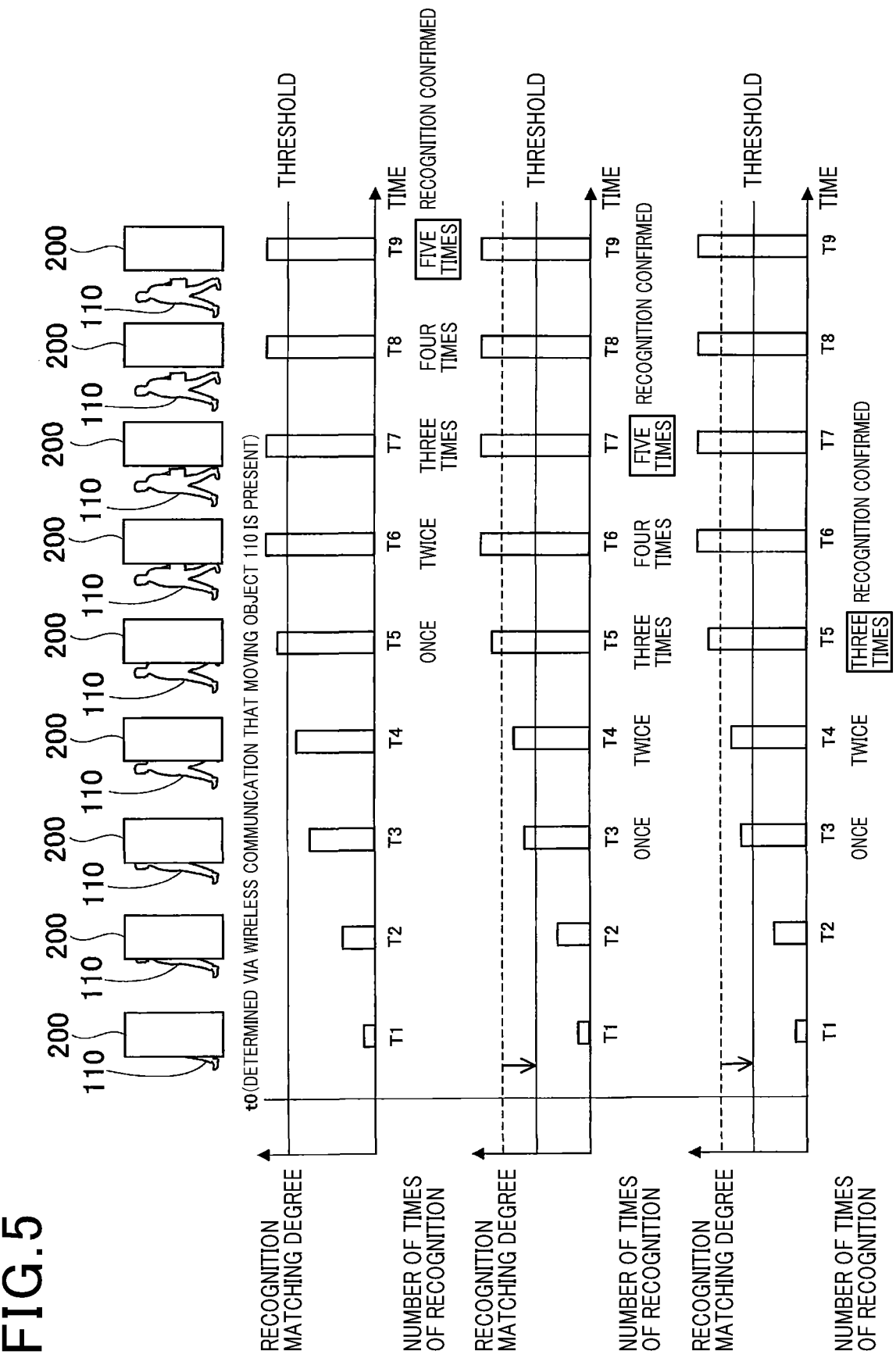

DRIVING ASSISTANCE DEVICE

CROSS-REFERENCE TO RELATED APPLICATIONS

This international application claims the benefit of priority from Japanese Patent Application No. 2016-023908 filed with the Japan Patent Office on Feb. 10, 2016 and Japanese Patent Application No. 2017-010549 filed with the Japan Patent Office on Jan. 24, 2017, the contents of which are incorporated herein by reference.

TECHNICAL FIELD

The present disclosure relates to a technique for avoiding a collision between the own vehicle and a moving object around the own vehicle.

BACKGROUND ART

A technique for avoiding a collision between the own vehicle and a moving object around the own vehicle has been known. For example, a technique has been known in which a probability of a collision between the own vehicle and a moving object is calculated on the basis of a position and a vehicle speed of the own vehicle which is travel information on the own vehicle and a position and a speed of the moving object which is movement information on the moving object, and when the probability of the collision is high, a brake is activated. The movement information on the moving object is detected by a detection device, such as a camera and a millimeter wave radar, which is mounted on the own vehicle.

Patent Literature 1 below describes a technique in which, when a risk of collision between a first vehicle and a second vehicle which is present in a traveling direction of the first vehicle is equal to or greater than a threshold, alarm information is transmitted from the first vehicle to the second vehicle via wireless communication. The alarm information includes the risk of collision, information on a position of the first vehicle, and the traveling direction of the first vehicle.

When the first vehicle which has transmitted the alarm information is located behind the second vehicle and the second vehicle receives the alarm information from a communication device of the first vehicle which is an external device provided outside the first vehicle, the second vehicle attempts to avoid a collision with the first vehicle or reduce collision damage by starting to move, releasing holding of a stationary state, or accelerating.

CITATION LIST

Patent Literature

[PTL 1] JP 2008-181200 A

SUMMARY OF THE INVENTION

In a case where movement information on a moving object around the own vehicle is indirectly acquired via wireless communication or the like as in the technique described in Patent Literature 1, reliability of the acquired movement information is presumably low as compared with a case where movement information on the moving object is directly acquired from a vehicle-mounted detection device such as a camera and a millimeter wave radar.

As a result of detailed examination, the inventor has found a problem in which when the own vehicle itself avoids a collision with a moving object around the own vehicle by controlling a brake or steering on the basis of indirectly acquired movement information on the moving object, the own vehicle may perform unnecessary avoidance driving action with respect to the moving object with which the own vehicle does not collide. Furthermore, the inventor has found a problem in which when the own vehicle performs the avoidance driving action with respect to a moving object which has not been detected by the detection device, an occupant to feel anxiety.

Meanwhile, even though reliability of the indirectly acquired movement information on the moving object is low, there is a possibility that the own vehicle collides with the moving object. Accordingly, it is preferable to perform some kind of control in order to avoid a collision between the own vehicle and the moving object.

An aspect of the present disclosure preferably provides a technique in which in a case where a moving object around the own vehicle is not detected by a vehicle-mounted detection device, the own vehicle is properly controlled in order to avoid a collision between the own vehicle and the moving object, while avoiding causing an occupant to feel anxiety.

A driving assistance device according to an aspect of the present disclosure includes a travel information acquisition unit, a first information acquisition unit, a second information acquisition unit, a collision determination unit, a driving control unit, a presence determination unit, and an early control unit.

The travel information acquisition unit acquires at least a position and a vehicle speed of the own vehicle as travel information on the own vehicle. The first information acquisition unit acquires, as first movement information on a moving object around the own vehicle, at least a position and a speed of the moving object from a detection device which is mounted on the own vehicle. The second information acquisition unit acquires, as second movement information on the moving object, at least a position and a speed of the moving object from an external device which is provided outside the own vehicle.

The collision determination unit determines, on the basis of the travel information acquired by the travel information acquisition unit and the first movement information acquired by the first information acquisition unit, whether the own vehicle is likely to collide with the moving object. The driving control unit controls driving of the own vehicle so that the own vehicle performs avoidance driving action, in order to avoid a collision between the own vehicle and the moving object, when the collision determination unit determines that the own vehicle is likely to collide with the moving object.

The presence determination unit determines, on the basis of the travel information and the second movement information acquired by the second information acquisition unit, whether the moving object is present ahead of the own vehicle in its traveling direction, in a case where the moving object is not detected by the detection device. The early control unit performs early control for advancing a timing at which the moving object is detected by the detection device and the driving control unit performs control so that the own vehicle performs collision avoidance driving action, when the presence determination unit determines that the moving object is present ahead of the own vehicle in its traveling direction in a case where the moving object is not detected by the detection device.

In the above configuration, when the presence determination unit determines that the moving object is present ahead of the own vehicle in its traveling direction in a case where the moving object is not detected by the detection device, the early control unit performs the early control so that the own vehicle performs the avoidance driving action at an early timing. Thus, in an aspect of the present disclosure, proper control for early avoidance of a collision between the own vehicle and the moving object increases a probability of avoiding the collision. Even if the own vehicle collides with the moving object, it is possible to reduce damage to the own vehicle and the moving object.

Furthermore, the own vehicle does not perform the avoidance driving action until the moving object is detected by the detection device.

This makes it possible to prevent or suppress occupant's anxiety caused by the avoidance driving action that the own vehicle performs with respect to a moving object which has not been detected by the detection device. Note that reference signs in parentheses in the claims indicate a correspondence relationship with specific means stated in an embodiment described later as an aspect and do not limit a technical scope of the present disclosure.

BRIEF DESCRIPTION OF THE DRAWINGS

FIG. 5 is a time chart showing a process of recognizing a moving object and confirming presence of the moving object.

DESCRIPTION OF EMBODIMENTS

An embodiment to which the present disclosure is applied will be described below with reference to the drawings.

1. Configuration

Figure 1:
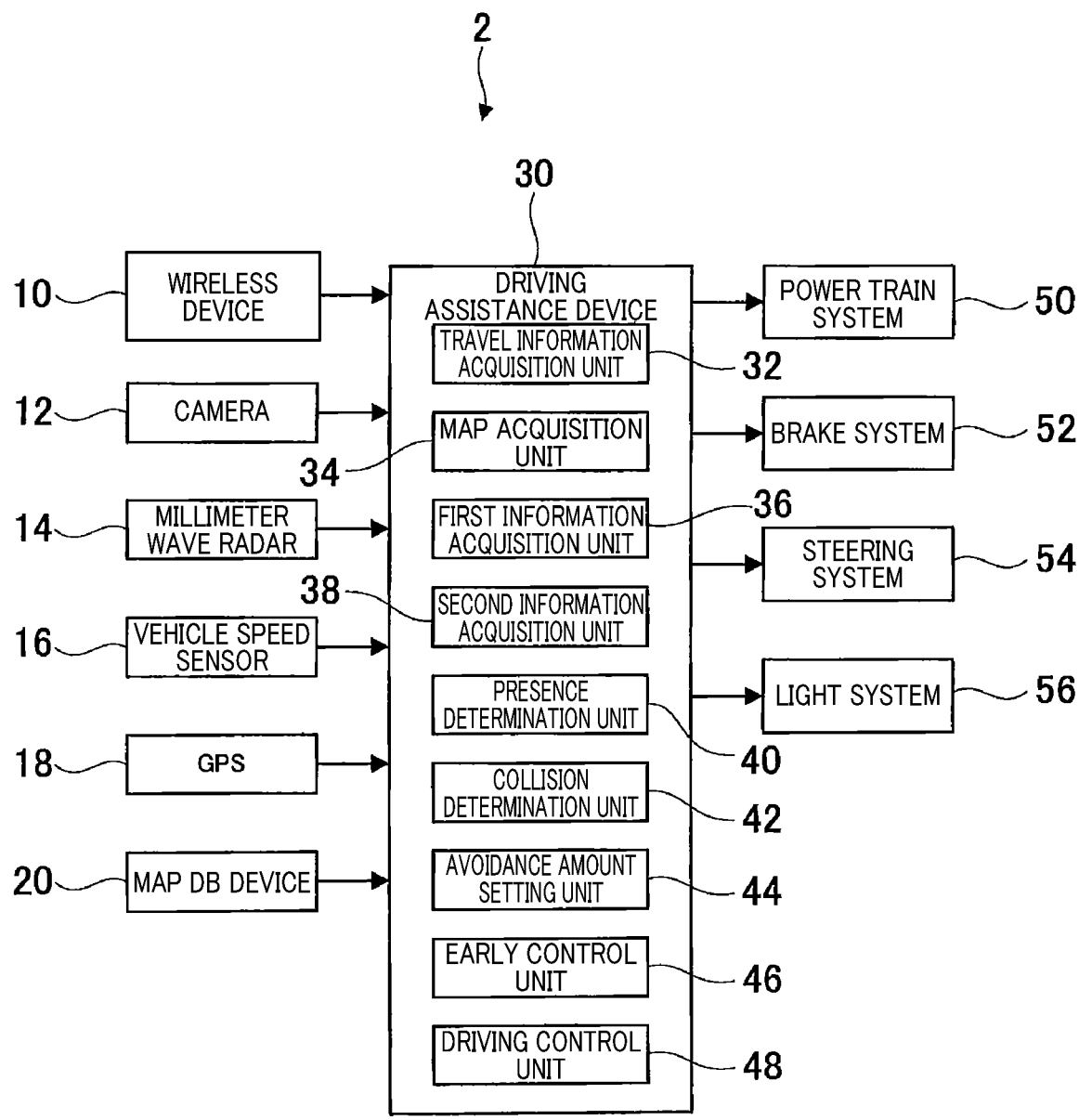
FIG. 1 is a block diagram illustrating a driving assistance system according to the present embodiment.

A driving assistance system 2 illustrated in FIG. 1 is mounted on a vehicle and includes a wireless device 10, a camera 12, a millimeter wave radar 14, a vehicle speed sensor 16, a GPS 18, a map DB device 20, a driving assistance device 30, a power train system 50, a brake system 52, a steering system 54, and a light system 56. The own vehicle indicates the vehicle on which the driving assistance system 2 is mounted.

The wireless device 10 wirelessly communicates with an external device which is provided outside the own vehicle. The external device can be provided in any of a human, a bicycle, another vehicle equipped with a drive source, roadside equipment, and a control center.

The camera 12 captures an image of an area ahead of the own vehicle, an area on a lateral side of the own vehicle, and an area behind the own vehicle. An image analysis device (not shown) analyzes data on the image captured by the camera 12 so that a moving object which is present in the area ahead of the own vehicle, the area on the lateral side of the own vehicle, and the area behind the own vehicle is detected.

The millimeter wave radar 14 scans a predetermined angle range by outputting millimeter waves to the area ahead of the own vehicle, the area on the lateral side of the own vehicle, and the area behind the own vehicle. The millimeter wave radar 14 detects a reflected wave to the emitted millimeter waves. On the basis of time required for the millimeter waves to travel to and from an object which reflects the millimeter waves, the millimeter wave radar 14 obtains a distance to the object. On the basis of a direction in which the millimeter waves are emitted when the reflected wave is detected, the millimeter wave radar 14 determines a direction in which the object is present.

Instead of a radar, such as the millimeter wave radar 14, which emits electromagnetic waves, a LIDAR which emits laser beams can be used.

The vehicle speed sensor 16 detects a current vehicle speed of the own vehicle. The GPS 18 receives a positioning signal from a GPS satellite and measures a position of the own vehicle.

Map data stored in the map DB device 20 includes nodes and links indicating roads. The links connect the nodes each of which indicates an intersection, a branch point, a merging point, or the like. The roads are constituted by connecting the links. For each of the links, data such as an identification number, a link length, latitudes and longitudes indicating coordinates of a starting point and an end point, a road type indicating an expressway, a national road, or the like, and the number of lanes is registered.

The driving assistance device 30 is equipped with a microcomputer including a CPU and a semiconductor memory such as RAM, ROM, and a flash memory. The driving assistance device 30 can be equipped with a single microcomputer or a plurality of microcomputers.

The CPU executes a program stored in a non-transitory computer readable tangible storage medium such as the ROM and the flash memory so that each function of the driving assistance device 30 is achieved. When the CPU executes the program, a method corresponding to the program is performed.

As a configuration for the function achieved when the CPU executes the program, the driving assistance device 30 includes a travel information acquisition unit 32, a map acquisition unit 34, a first information acquisition unit 36, a second information acquisition unit 38, a presence determination unit 40, a collision determination unit 42, an avoidance amount setting unit 44, an early control unit 46, and a driving control unit 48.

A technique for implementing these elements which constitute the driving assistance device 30 is not limited to software, and some or all of the elements can be implemented by using hardware in which a logic circuit, an analog circuit, and the like are combined. The function performed by each of the travel information acquisition unit 32, the map acquisition unit 34, the first information acquisition unit 36, the second information acquisition unit 38, the presence determination unit 40, the collision determination unit 42, the avoidance amount setting unit 44, the early control unit 46, and the driving control unit 48 will be described later.

In a case where the own vehicle is equipped with an internal combustion engine as a drive source, in accordance with a drive output instructed by the driving assistance device 30, the power train system 50 controls a degree of opening of a throttle device and a fuel injection amount. In a case where the own vehicle is equipped with a motor as the drive source, in accordance with the drive output instructed by the driving assistance device 30, the power train system 50 controls power supplied to the motor.

In accordance with a braking force instructed by the driving assistance device 30, the brake system 52 controls, as a brake device, for example, an actuator which is provided in a hydraulic circuit of a hydraulic brake. In a case where the own vehicle is equipped with a motor as the drive source, in accordance with the braking force instructed by the driving assistance device 30, the brake system 52 can control power supplied to the motor so that a braking force is generated by a regenerative brake.

The steering system 54 controls a traveling direction of the own vehicle by operating a steering wheel in accordance with torque instructed by the driving assistance device 30.

The light system 56 controls ON and OFF states of a light mounted on the own vehicle 100. In the case of headlights, the light system 56 controls an illumination direction and an amount of light from the headlights.

2. Process (1) Outline of Process

A driving assistance process which is performed by the driving assistance device 30 will be described by using situations illustrated in FIGS. 2 and 3 as examples.

Figure 2:
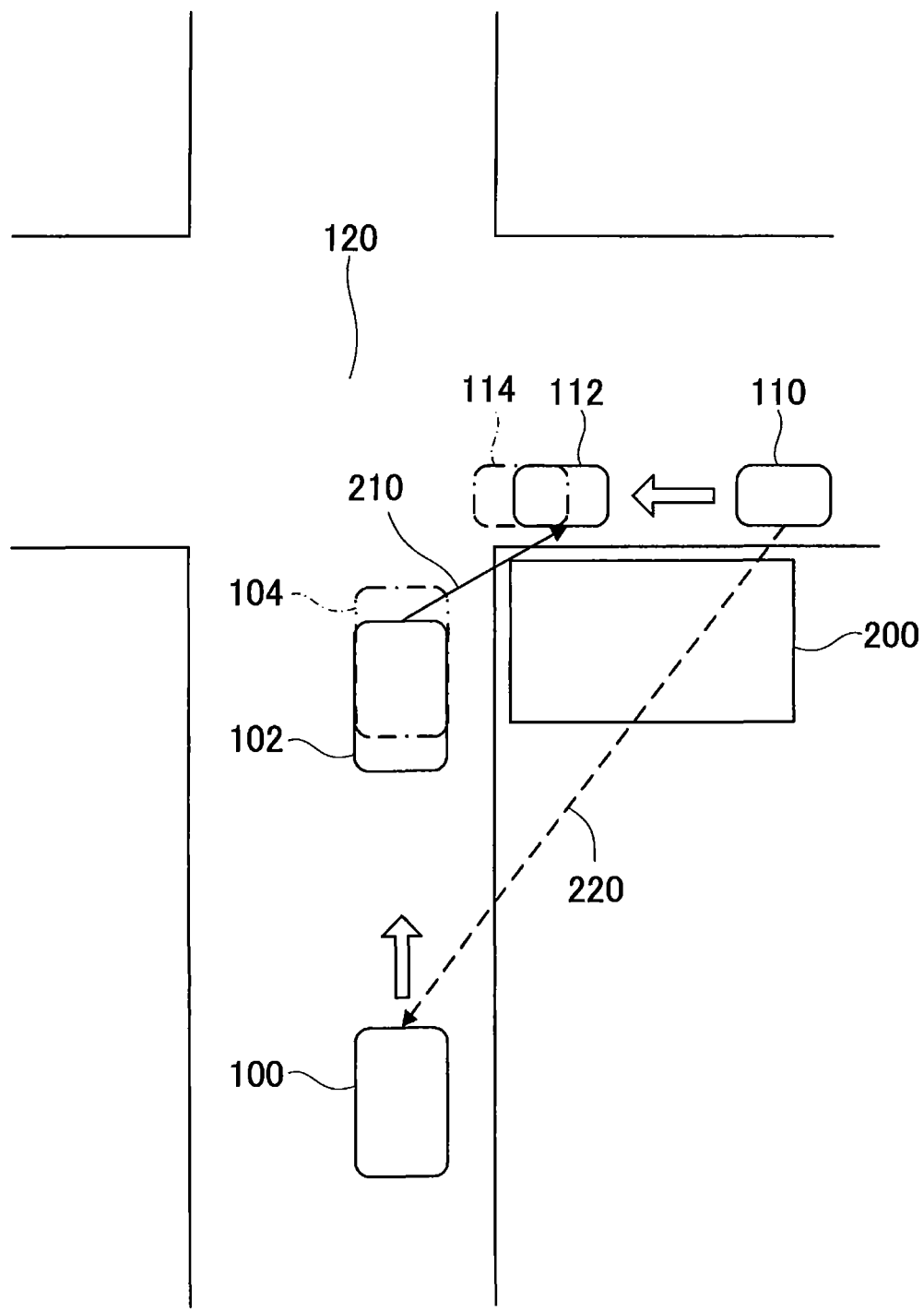
FIG. 2 is a schematic diagram illustrating a difference in timing of detecting an object, depending on the presence or absence of early control.

In the situation in FIG. 2, while the own vehicle 100 is traveling towards an intersection 120 with low visibility, for example, due to a shielding object 200 such as a building, a moving object 110 ahead of the own vehicle 100 in its traveling direction is moving from behind the shielding object 200 towards the same intersection 120.

Figure 3:
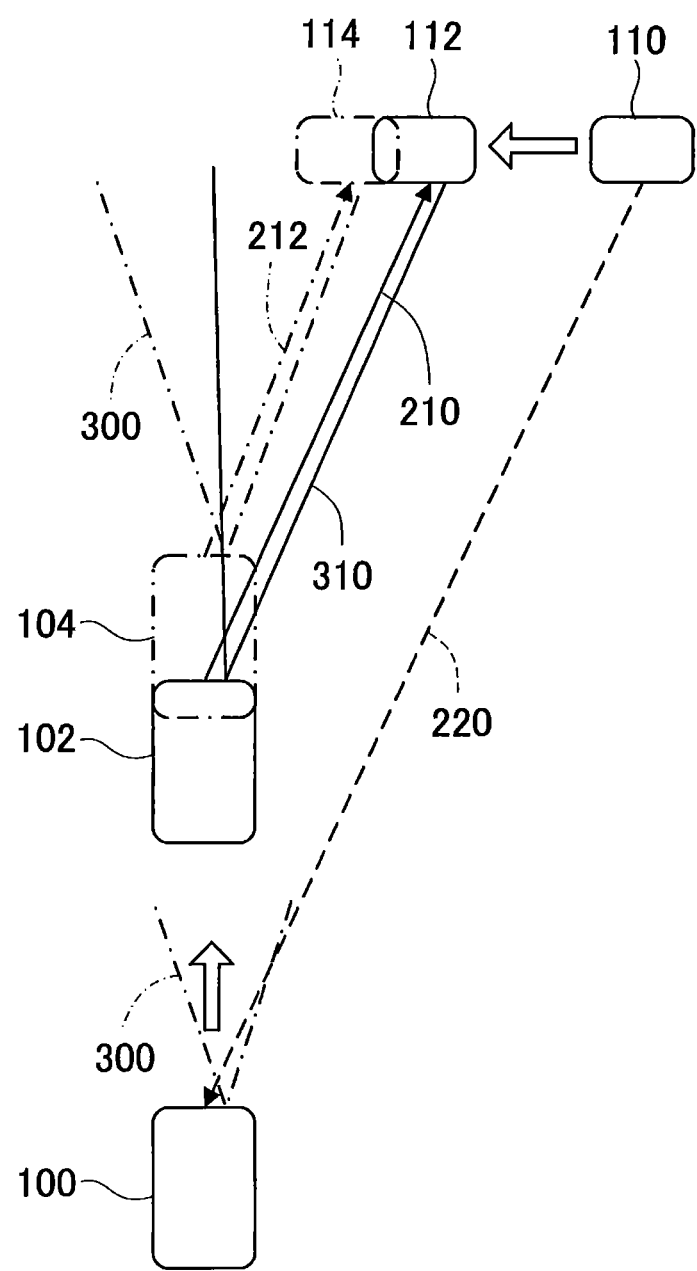
FIG. 3 is another schematic diagram illustrating a difference in timing of detecting an object, depending on the presence or absence of the early control.

In the situation in FIG. 3, for example, in a case where the headlights are on at nighttime, the moving object 110 is moving in an area ahead of the own vehicle 100 in its traveling direction in a direction which intersects the traveling direction of the own vehicle 100.

The own vehicle 100 is a vehicle which is equipped with wheels and at least one of an internal combustion engine and a motor as the drive source and in which at least one of a vehicle speed and a traveling direction is controllable by the driving assistance device 30.

The moving object 110 can be any object as long as it moves. For example, a human, a bicycle, and a vehicle equipped with wheels and a drive source correspond to the moving object 110.

As illustrated in FIG. 2, while the shielding object 200 obstructs the view of the moving object 110 from the own vehicle 100, the moving object 110 is not detected by the camera 12 and the millimeter wave radar 14. When the own vehicle 100 has reached a position 102, the moving object 110 which has moved to a position 112 is detectable by the camera 12 and the millimeter wave radar 14 as indicated by a sign 210.

However, even when, at the position 102, the moving object 110 is detected by at least one of the camera 12 and the millimeter wave radar 14 and the driving assistance device 30 provides instructions to the brake system 52, there is a time delay before the hydraulic brake is activated so that a braking force is applied to the own vehicle 100.

Thus, when the own vehicle 100 has reached a position 104 and the moving object 110 has moved to a position 114, the braking force is applied to the own vehicle 100 after the time delay. This makes it difficult to avoid a collision between the own vehicle 100 and the moving object 110.

Each time the driving assistance device 30 acquires first movement information from at least one of the camera 12 and the millimeter wave radar 14, when a recognition matching degree for recognizing the moving object 110 is equal to or greater than a threshold, the driving assistance device 30 recognizes that the moving object 110 is present.

The recognition matching degree is a probability when the driving assistance device 30 recognizes, on the basis of the first movement information, that the moving object 110 is present. The recognition matching degree is represented by, for example, a value such as percentage. When the number of times of recognition of the moving object 110 becomes equal to or greater than a threshold, the driving assistance device 30 confirms the presence of the moving object 110. The number of times of recognition of the moving object 110 is the number of times that the driving assistance device 30 recognizes that the moving object 110 is present because the recognition matching degree is equal to or greater than the threshold.

When the presence of the moving object 110 is confirmed, the driving assistance device 30 provides instructions to at least one of the brake system 52 and the steering system 54 so that the own vehicle 100 performs avoidance driving action by applying a braking force or performing steering. Accordingly, the own vehicle 100 does not perform the avoidance driving action until the number of times of recognition of the moving object 110 becomes equal to or greater than the threshold.

In the situation in FIG. 3, the moving object 110 is moving in a position outside an illumination range 300 of the headlights by which an area ahead of the own vehicle 100 is illuminated at nighttime. This causes the moving object 110 to be undetectable by at least the camera 12 of the camera 12 and the millimeter wave radar 14. When the own vehicle 100 has reached the position 104 and the moving object 110 has moved to the position 114, the moving object 110 has moved to the illumination range 300 of the headlights. This enables the moving object 110 to be detectable by the camera 12.

However, even when, at the position 104, the moving object 110 is detected by the camera 12 as indicated by a sign 212 and the driving assistance device 30 controls driving of the own vehicle 100 so that the own vehicle 100 performs the avoidance driving action by applying a braking force or performing steering, the own vehicle 100 and the moving object 110 are located close to each other. This makes it difficult to avoid a collision between the own vehicle 100 and the moving object 110.

Thus, as illustrated in FIGS. 2 and 3, the driving assistance device 30 indirectly acquires, via wireless communication 220 from an external device which is provided in an object other than the own vehicle 100, second movement information on the moving object 110 which includes at least a position and a moving speed of the moving object 110. In contrast to the second movement information, movement information which includes at least a position and a moving speed of the moving object 110 and is directly acquired by the driving assistance device 30 from the camera 12 and the millimeter wave radar 14 is referred to as first movement information.

The driving assistance device 30 acquires a vehicle speed of the own vehicle 100 from the vehicle speed sensor 16 and acquires a position of the own vehicle 100 from the GPS 18 and on the basis of the map data stored in the map DB device 20. Information including at least the position and the vehicle speed of the own vehicle 100 is travel information on the own vehicle 100.

The driving assistance device 30 is capable of detecting a traveling direction of the own vehicle 100 and a traveling direction of the moving object 110 on the basis of a change in position.

The external device can be provided in any object, provided that the external device is a wireless device capable of wirelessly transmitting the second movement information on the moving object 110. As illustrated in FIGS. 2 and 3, a position and a moving speed of the moving object 110 can be detected by the moving object 110 itself and transmitted via the wireless device. A position and a moving speed of the moving object 110 can be transmitted via the wireless device by roadside equipment which detects the position and the moving speed of the moving object 110. A position and a moving speed of the moving object 110 can be transmitted via the wireless device by a control center which receives the position and the moving speed from the moving object 110.

In a case where the moving object 110 is not detected by both of the camera 12 and the millimeter wave radar 14 in the situation in FIG. 2 and the moving object 110 is not detected by the camera 12 in the situation in FIG. 3, the driving assistance device 30 determines, on the basis of the travel information and the second movement information, whether the moving object 110 is present ahead of the own vehicle 100 in its traveling direction.

In the situations in FIGS. 2 and 3, when the moving object 110 is present ahead of the own vehicle 100 in its traveling direction, the driving assistance device 30 performs advance control for early avoidance of a collision between the own vehicle 100 and the moving object 110, without changing the vehicle speed and the traveling direction as a driving state of the own vehicle 100.

The early control is control for advancing a timing at which the moving object 110 becomes detectable by at least one of the camera 12 and the millimeter wave radar 14 in the situation in FIG. 2 and by the camera 12 in the situation in FIG. 3 and the driving assistance device 30 performs control so that the own vehicle 100 performs the avoidance driving action for avoiding a collision between the own vehicle 100 and the moving object 110.

As illustrated in FIG. 3, even in a case where the moving object 110 is not detected by the camera 12 at nighttime, the moving object 110 is detectable by the millimeter wave radar 14. However, reliability of the first movement information is higher when the moving object 110 is detected by both of the camera 12 and the millimeter wave radar 14. In the case of a vehicle which is equipped with only the camera 12 and is not equipped with the millimeter wave radar 14, the vehicle is preferably configured such that the moving object 110 is detectable early by the camera 12.

As the early control which is performed when, as illustrated in FIG. 2, the moving object 110 is not detected by both of the camera 12 and the millimeter wave radar 14 due to the obstruction by the shielding object 200 and the driving assistance device 30 determines via the wireless communication 220 that the moving object 110 is present ahead of the own vehicle 100 in its traveling direction, the following (1) to (3) can be performed.

(1) The driving assistance device 30 instructs the brake system 52 to apply a driving force from the drive source of the brake device to the brake device to such an extent that the brake device is not activated. For example, in a case where the brake device is a hydraulic brake, the driving assistance device 30 applies a hydraulic pressure to the hydraulic brake to such an extent that the hydraulic brake is not activated so that no braking force is applied to the own vehicle 100.

(2) The driving assistance device 30 acquires the first movement information on the moving object 110 from at least one of the camera 12 and the millimeter wave radar 14, and the driving assistance device 30 reduces the threshold which is compared with the recognition matching degree for the moving object 110 in order to recognize presence of the moving object 110 on the basis of the acquired first movement information and confirm the presence of the moving object 110.

(3) The driving assistance device 30 acquires the first movement information from at least one of the camera 12 and the millimeter wave radar 14, and the driving assistance device 30 reduces the threshold for the number of times of recognition of the moving object 110 which is required in order to recognize presence of the moving object 110 on the basis of the acquired first movement information and confirm the presence of the moving object 110.

In the situation in FIG. 2, when the own vehicle 100 has reached the position 102 and the moving object 110 has moved to the position 112, and the moving object 110 is detected by at least one of the camera 12 and the millimeter wave radar 14, the early control in (1) enables the hydraulic brake to be quickly activated.

Furthermore, in the situation in FIG. 2, when the own vehicle 100 has reached the position 102 and the moving object 110 has moved to the position 112, and the moving object 110 becomes detectable by at least one of the camera 12 and the millimeter wave radar 14, the early control in (2) enables presence of the moving object 110 to be recognized at an early timing.

Furthermore, in the situation in FIG. 2, when the own vehicle 100 has reached the position 102 and the moving object 110 has moved to the position 112, and the moving object 110 becomes detectable by at least one of the camera 12 and the millimeter wave radar 14, the early control in (3) enables the presence of the moving object 110 to be confirmed at an early timing.

Accordingly, the driving assistance device 30 instructs the brake system 52 to apply a hydraulic pressure to the hydraulic brake at an earlier timing, and this enables the hydraulic brake to be activated at an earlier timing. Furthermore, the driving assistance device 30 instructs the steering system 54 to start steering in a direction to avoid a collision with the moving object 110 at an earlier timing. That is, the own vehicle 100 can perform the avoidance driving action at an early timing.

As illustrated in FIG. 3, in a case where the moving object 110 is located outside the illumination range 300 while the headlights are on and this causes the moving object 110 to be undetectable by at least the camera 12 of the camera 12 and the millimeter wave radar 14, the driving assistance device 30 can perform the early control in (4) below.

(4) In a case where the headlights are on, on the basis of the travel information on the own vehicle 100 and the second movement information, the driving assistance device 30 provides illumination from the headlights towards a place where the moving object 110 is present.

In the situation in FIG. 3, when the driving assistance device 30 performs the early control in (4), the moving object 110 is illuminated in the illumination range 310 of the headlights, and this enables the moving object 110 which has not been detected by the camera 12 to become detectable by the camera 12 at an earlier timing.

Thus, when the own vehicle 100 has reached the position 102 which is closer to an original position of the own vehicle 100 than the position 104 is, and the moving object 110 has moved to the position 112 which is closer to an original position of the moving object 110 than the position 114 is, the moving object 110 is detectable by the camera 12 at an early timing as indicated by the sign 210. Accordingly, as with the early control in (2) and (3), the activation of the hydraulic brake and the start of the steering are performed at an earlier timing. This allows the own vehicle 100 to perform the avoidance driving action at an early timing.

As with the situation in FIG. 3, in a case where an area ahead of the own vehicle 100 in its traveling direction is illuminated by the headlights at nighttime, the moving object 110 may be undetectable by the camera 12 due to an insufficient amount of light from the headlights. In such a case, as the early control that the driving assistance device 30 performs on the basis of the second movement information acquired from the external device via the wireless communication 220, the following (5) can be performed.

(5) In a case where the headlights are on at nighttime, the driving assistance device 30 increases an amount of light from the headlights, for example, by setting the headlights to high beam.

When the driving assistance device 30 performs the early control in (5), the amount of light from the headlights by which the moving object 110 is illuminated is increased. This enables the moving object 110 to be detectable by the camera 12 at an early timing as compared with a case where the amount of light from the headlights by which the moving object 110 is illuminated is increased when the own vehicle 100 and the moving object 110 approach each other. This allows the own vehicle 100 to perform the avoidance driving action at an early timing.

(2) Driving Assistance Process

Figure 4:
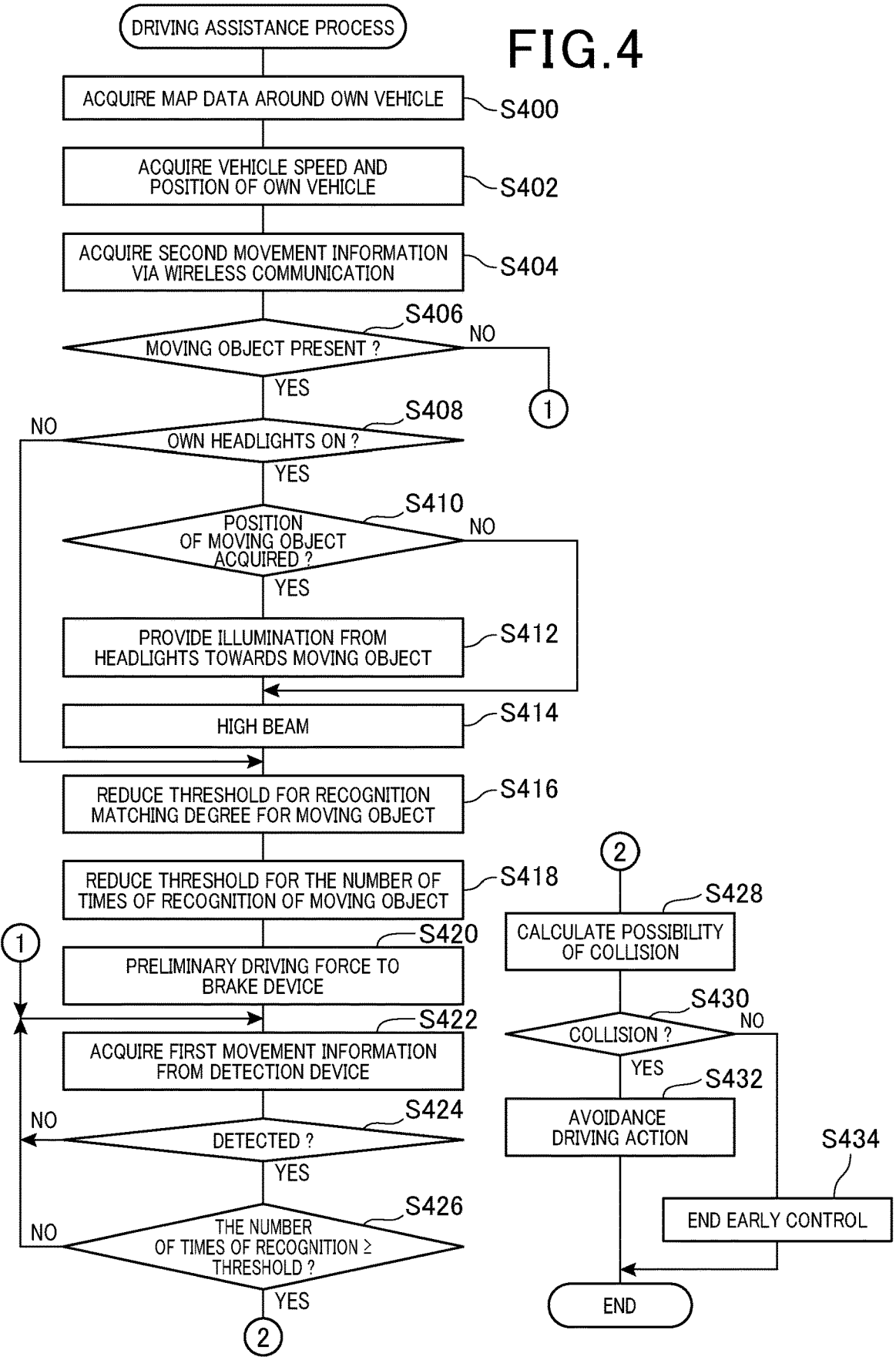
FIG. 4 is a flow chart showing a driving assistance procedure.

With reference to a flow chart shown in FIG. 4, the following will describe the driving assistance process that the driving assistance device 30 performs in order to avoid a collision between the own vehicle 100 and the moving object 110. In the driving assistance process in FIG. 4, in a case where the moving object 110 is not detected by at least the camera 12 of the camera 12 and the millimeter wave radar 14, the early control is performed. The driving assistance process in FIG. 4 is continuously performed. In FIG. 4, "S" denotes a step.

At S400, the map acquisition unit 34 acquires a current position of the own vehicle 100 from the GPS 18 and maps the position of the own vehicle 100 on the map data which is acquired from the map DB device 20.

At S402, the driving action information acquisition unit 32 acquires a vehicle speed of the own vehicle 100 from the vehicle speed sensor 16 and acquires the position of the own vehicle 100 which has been mapped on the map data by the map acquisition unit 34.

At S404, the second information acquisition unit 38 acquires second movement information that the wireless device 10 receives from the external device via wireless communication.

At S406, in a case where the moving object 110 is not detected by at least the camera 12 of the camera 12 and the millimeter wave radar 14, the presence determination unit 40 determines whether the moving object 110 to be avoided is present ahead of the own vehicle 100 in its traveling direction. On the basis of the driving action information and the second movement information, the presence determination unit 40 determines whether the moving object 110 is present.

When a negative determination is made at S406 (NO at S406), that is, when the moving object 110 to be avoided is not present ahead of the own vehicle 100 in its traveling direction in a case where the moving object 110 is not detected by the camera 12, the processing proceeds to S422.

When an affirmative determination is made at S406 (YES at S406), that is, when the moving object 110 to be avoided is present ahead of the own vehicle 100 in its traveling direction in a case where the moving object 110 is not detected by the camera 12, at S408, the early control unit 46 determines whether the own headlights are on. When a negative determination is made at S408 (NO at S408), that is, when the headlights are not on, the processing proceeds to S416.

When an affirmative determination is made at S408 (YES at S408), that is, when the headlights are on, at S410, the early control unit 46 determines whether a position of the moving object 110 has been able to be acquired from the second movement information. The second movement information may merely indicate that the moving object 110 is present ahead of the own vehicle 100 in its traveling direction and may not indicate a precise position of the moving object 110.

When a negative determination is made at S410 (NO at S410), that is, when the position of the moving object 110 has not been able to be acquired, it is impossible to provide illumination from the headlights towards a place where the moving object 110 is present. Thus, the processing proceeds to S414 at which the headlights are switched to high beam.

When an affirmative determination is made at S410 (YES at S410), that is, when the position of the moving object 110 has been able to be acquired, at S412, the early control unit 46 instructs the light system 56 to provide illumination from the headlights towards the moving object 110.

At S414, in a case where the headlights are on low beam, the early control unit 46 instructs the light system 56 to switch the headlights to high beam.

At S416, the early control unit 46 reduces the threshold which is compared with the recognition matching degree for the moving object 110 in order to recognize presence of the moving object 110 on the basis of the first movement information and confirm the presence of the moving object 110.

At S418, the early control unit 46 reduces the threshold for the number of times of recognition of the moving object 110 which is required in order to recognize presence of the moving object 110 on the basis of the first movement information and confirm the presence of the moving object 110.

The following will describe, with reference to FIG. 5, recognition of the moving object 110 when the early control unit 46 reduces at S416 the threshold which is compared with the recognition matching degree for the moving object 110 and reduces at S418 the threshold for the number of times of recognition of the moving object 110. FIG. 5 shows appearance of the moving object 110 from behind the shielding object 200 over time and time charts which show, in upper, middle, and lower parts, a process in which the moving object 110 is recognized and the presence of the moving object 110 is confirmed.

In the time chart in the upper part in FIG. 5, the threshold which is compared with the recognition matching degree is not changed, and the number of times of recognition of the moving object 110 for confirming the presence of the moving object 110 is not changed and is five times (shown in a box).

As shown in the time chart in the middle part in FIG. 5, when the early control unit 46 reduces the threshold which is compared with the recognition matching degree for the moving object 110 from a value indicated by a dotted line to a value indicated by a solid line, the collision determination unit 42 recognizes at timing T3 for the first time that the moving object 110 is present.

Meanwhile, in the time chart in the upper part in FIG. 5 in which the threshold which is compared with the recognition matching degree is not reduced, the collision determination unit 42 recognizes at timing T5 for the first time that the moving object 110 is present. Accordingly, the reduction in the threshold which is compared with the recognition matching degree for the moving object 110 enables the moving object 110 to be recognized at an early timing. Thus, even though the threshold for the number of times of recognition of the moving object 110 is also five times, a timing at which the presence of the moving object 110 ahead of the own vehicle 100 in its traveling direction is confirmed is advanced from T9 to T7.

Even when, in addition to the threshold which is compared with the recognition matching degree, the threshold for the number of times of recognition of the moving object 110 is reduced from five times shown in the time chart in the middle part in FIG. 5 to three times shown in the time chart in the lower part in FIG. 5, a timing at which the collision determination unit 42 realizes for the first time that the moving object 110 is present is still T3. However, a timing at which the presence of the moving object 110 ahead of the own vehicle 100 in its traveling direction is confirmed is advanced from T7 to T5.

At S420, the early control unit 46 instructs the brake system 52 to preliminarily apply hydraulic pressure as a driving force to the hydraulic brake to such an extent that the hydraulic brake is not activated.

At S422, the first information acquisition unit 36 acquires first movement information from the camera 12 and the millimeter wave radar 14. At S424, the collision determination unit 42 determines whether, on the basis of the first movement information, the moving object 110 has been recognized and detected.

In a case where, at S416, the early control unit 46 has reduced the threshold which is compared with the recognition matching degree for the moving object 110, at S424, the collision determination unit 42 recognizes presence of the moving object 110 at an earlier timing than in a case where the threshold which is compared with the recognition matching degree has not been reduced. When a negative determination is made at S424 (NO at S424), that is, when the moving object 110 has not been detected, control returns to S422.

When an affirmative determination is made at S424 (YES at S424), that is, when the moving object 110 has been recognized and detected, S422 and S424 are performed until an affirmative determination is made by the collision determination unit 42 at S426 (YES at S426), that is, until the number of times that the moving object 110 is detected and presence of the moving object 110 is recognized becomes equal to or greater than the threshold.

In a case where, at S418, the early control unit 46 has reduced the threshold for the number of times of recognition of the moving object 110 which is required in order to recognize presence of the moving object 110 and confirm the presence of the moving object 110, an affirmative determination is made by the collision determination unit 42 at S426 (YES at S426) at an earlier timing than in a case where the threshold for the number of times of recognition of the moving object 110 has not been reduced. When an affirmative determination is made at S426 (YES at S426), the presence of the moving object 110 is confirmed.

When an affirmative determination is made at S426 (YES at S426), that is, when the presence of the moving object 110 is confirmed, at S428, the collision determination unit 42 calculates a probability of a collision between the own vehicle 100 and the moving object 110.

Specifically, on the basis of the first movement information on the moving object 110 acquired from the camera 12 and the millimeter wave radar 14 and the driving action information on the own vehicle 100, the collision determination unit 42 calculates TTC which is predicted time until the own vehicle 100 collides with the moving object 110. TTC is an abbreviation for Time to Collision. As TTC is shorter, the collision determination unit 42 determines that a first probability of a collision between the own vehicle 100 and the moving object 110 is higher.

At S430, the collision determination unit 42 determines whether the own vehicle 100 is likely to collide with the moving object 110. When the probability of the collision between the own vehicle 100 and the moving object 110 is high and is equal to or greater than a predetermined threshold, the collision determination unit 42 determines that the own vehicle 100 is likely to collide with the moving object 110.

When a negative determination is made at S430 (NO at S430), that is, when the own vehicle 100 is not likely to collide with the moving object 110, the processing proceeds to S434.

When an affirmative determination is made at S430 (YES at S430), that is, when the own vehicle 100 is likely to collide with the moving object 110, at S432, on the basis of an amount of avoidance which is set by the avoidance amount setting unit 44, the driving control unit 48 performs control so that the moving object 110 perform the avoidance driving action for avoiding a collision between the own vehicle 100 and the moving object 110.

On the basis of the probability of the collision determined by the collision determination unit 42, the avoidance amount setting unit 44 sets the amount of avoidance on the basis of which the driving control unit 48 controls driving of the own vehicle 100 so that the own vehicle 100 performs the avoidance driving action in order to avoid a collision between the own vehicle 100 and the moving object 110.

For example, even when a driver is pressing an accelerator pedal, as first avoidance driving action with a braking force, the driving assistance device 30 instructs the power train system 50 to switch off the accelerator. That is, in a case where the drive source is an internal combustion engine, a throttle opening is totally closed and an injection amount from an injector becomes zero. In a case where the drive source is a motor, the driving assistance device 30 shuts off power supply to the motor.

When the throttle opening is totally closed and the injection amount from the injector becomes zero, engine braking is activated so that a braking force is applied. When the power supply to the motor is shut off, a regenerative brake is activated so that a braking force is applied.

Furthermore, as the avoidance driving action with a braking force, the driving assistance device 30 instructs the brake system 52 to activate the hydraulic brake.

As the avoidance driving action with steering, the driving assistance device 30 instructs the steering system 54 to perform steering in a direction to avoid the moving object 110.

At S434, in a case where the early control is being performed, the early control unit 46 ends the early control.

3. Effects

The aforementioned embodiment yields the following effects.

(1) When the driving assistance device 30 determines via wireless communication that the moving object 110 is present ahead of the own vehicle 100 in its traveling direction in a case where the moving object 110 is not detected by both of the camera 12 and the millimeter wave radar 14 or at least the camera 12, the driving assistance device 30 performs the early control for advancing a timing at which the avoidance driving action is performed.

This allows the own vehicle 100 to perform the avoidance driving action at an earlier timing than in a case where, after the moving object 110 becomes detectable by the camera 12 and the millimeter wave radar 14, without performing the early control, driving of the own vehicle 100 is controlled so that the own vehicle 100 performs the avoidance driving action. Thus, the proper control for avoiding a collision between the own vehicle 100 and the moving object 110 increases the probability of avoiding the collision. Even if the own vehicle 100 collides with the moving object 110, it is possible to reduce damage to the own vehicle 100 and the moving object 110.

In contrast to the aforementioned embodiment, it can be configured such that the own vehicle 100 performs the avoidance driving action at an early timing, by enabling the moving object 110 to be detectable at an early timing by the detection device itself, such as the camera 12 and the millimeter wave radar 14, which is mounted on the own vehicle.

For example, in the case of a camera, when a position where a moving object is present is acquired from roadside equipment or the like via wireless communication, a viewing angle of the camera can be reduced towards the position where the moving object is present. The reduction in the viewing angle of the camera increases the number of pixels allocated to the reduced viewing angle as compared with the number of pixels allocated to the viewing angle before the reduction. This improves accuracy in detecting a distant moving object. This makes it possible to detect a distant moving object at an early timing.

In the case of a radar, when a position where a moving object is present is acquired from roadside equipment or the like via wireless communication, intensity of a detection signal emitted from the radar towards a place where the moving object is present can be increased as compared with intensity of the detection signal emitted from the radar towards a place where the moving object is not present. The increase in intensity of the detection signal enables the radar to detect a moving object at a farther distance. This makes it possible to detect a distant moving object at an early timing.

However, in a case where the viewing angle of the camera is reduced or the intensity of the detection signal emitted from the radar is changed depending on whether the detection signal is emitted towards the place where the moving object is present or the detection signal is emitted towards the place where the moving object is not present, the detection device itself, such as the camera and the radar, needs to have a function of changing detection accuracy for the moving object. Accordingly, in the case of the detection device which does not have the function of changing detection accuracy, it is impossible for the detection device to detect a moving object at an early timing by changing detection accuracy.

Meanwhile, in the aforementioned embodiment, detection accuracy of the detection device itself, such as the camera 12 and the millimeter wave radar 14, is not changed, and presence of the moving object 110 is recognized and the presence of the moving object 110 is confirmed at an early timing by the process other than a process of changing the detection accuracy of the detection device.

Accordingly, the aforementioned embodiment allows the own vehicle 100 to perform the avoidance driving action at an early timing even in a case where the detection device which does not have the function of changing detection accuracy is used. Naturally, in a case where the detection accuracy of the detection device itself is changeable, improvement of the detection accuracy makes it possible to recognize presence of the moving object 110 and confirm the presence of the moving object 110 at an earlier timing.

(2) The own vehicle 100 does not perform the avoidance driving action until the moving object 110 is detected by the camera 12 and the millimeter wave radar 14. This makes it possible to prevent or suppress occupant's anxiety caused by the avoidance driving action that the own vehicle 100 performs with respect to the moving object 110 which has not been detected by the camera 12 and the millimeter wave radar 14.

In the aforementioned embodiment, the camera 12 and the millimeter wave radar 14 correspond to the detection device.

Furthermore, S402 corresponds to the process performed by the travel information acquisition unit 32, S404 corresponds to the process performed by the second information acquisition unit 38, S406 corresponds to the process performed by the presence determination unit 40, S408 to S420 and S434 correspond to the process performed by the early control unit 46, S422 corresponds to the process performed by the first information acquisition unit 36, S424 to S430 correspond to the process performed by the collision determination unit 42, and S432 corresponds to the process performed by the driving control unit 48.

4. Other Embodiments (1) Instead of all types of the early control in (1) to (5) described in the aforementioned embodiment, the driving assistance device 30 can perform at least one type of the early control.

(2) In the driving assistance process illustrated in FIG. 4, the driving assistance device 30 performs the early control in a case where the moving object 110 is not detected by at least the camera 12 of the camera 12 and the millimeter wave radar 14, regardless of a cause of the undetectable moving object 110.

However, the undetectable moving object 110 can be classified into, for example, a moving object 110 which is not detected because the shielding object 200 is present and a moving object 110 which is not detected because it is nighttime. In a case where the moving object 110 is not detected because the shielding object 200 is present, the driving assistance device 30 performs the early control when the moving object 110 is not detected by both of the camera 12 and the millimeter wave radar 14. In a case where the moving object 110 is not detected because it is nighttime, the driving assistance device 30 performs the early control when the moving object 110 is not detected by at least the camera 12.

(3) When the amount of light from the headlights is increased, the headlights do not necessarily need to be set to high beam, and only the amount of light can be increased without changing the illumination range.

(4) In the aforementioned embodiment, a plurality of functions of a single component can be implemented by a plurality of components, or a single function of a single component can be implemented by a plurality of components. A plurality of functions of a plurality of components can be implemented by a single component, or a single function of a plurality of components can be implemented by a single component. Part of the configuration of the aforementioned embodiment can be omitted. At least part of the configuration of the aforementioned embodiment can be added to or substituted by another configuration of the aforementioned embodiment. Any aspect included in a technical idea specified only by the wording of the claims is an embodiment of the present disclosure.

(5) Other than the aforementioned driving assistance device, the present disclosure can also be implemented in various forms such as a driving assistance system including the driving assistance device, a driving assistance program for functioning a computer as the driving assistance device, a storage medium in which the driving assistance program is stored, and a driving assistance method.

The invention claimed is:

1. A driving assistance device comprising:
a travel information acquisition unit configured to acquire at least a position and a vehicle speed of an own vehicle as travel information on the own vehicle;
a first information acquisition unit configured to acquire, as first movement information on a moving object around the own vehicle, at least a position and a speed of the moving object from a detection device which is mounted on the own vehicle;
a second information acquisition unit configured to acquire, as second movement information on the moving object, at least a position and a speed of the moving object from an external device which is provided outside the own vehicle;
a collision determination unit configured to determine, on a basis of the travel information acquired by the travel information acquisition unit and the first movement information acquired by the first information acquisition unit, whether the own vehicle is likely to collide with the moving object;
a driving control unit configured to control driving of the own vehicle so that the own vehicle performs avoidance driving action, in order to avoid a collision between the own vehicle and the moving object, when the collision determination unit determines that the own vehicle is likely to collide with the moving object;
a presence determination unit configured to determine, in response to the moving object not being detected by the detection device and based on the travel information and the second movement information acquired by the second information acquisition unit, whether the moving object is present ahead of the own vehicle in its traveling direction, and
an early control unit configured to perform, in response to the presence determination unit determining that the moving object is present ahead of the own vehicle in its traveling direction, early control to advance a timing at which the moving object is detected by the detection device and a timing at which the driving control unit performs control so that the own vehicle performs the avoidance driving action.

2. The driving assistance device according to claim 1, wherein the early control unit is configured to
reduce, as the early control, a threshold for the number of times of recognition of the moving object that is required for the collision determination unit to recognize a presence of the moving object on a basis of the first movement information, and
confirm the presence of the moving object.

3. The driving assistance device according to claim 1, wherein the early control unit is configured to
reduce, as the early control, a threshold, which is compared with a recognition matching degree for the moving object, in order for the collision determination unit to recognize presence of the moving object on a basis of the first movement information, and
confirm the presence of the moving object.

4. The driving assistance device according to claim 1, wherein the early control unit is configured to apply, as the early control, a driving force from a drive source of a brake device to the brake device to such an extent that the brake device is not activated.

5. The driving assistance device according to claim 1, wherein the early control unit is configured to provide, as the early control, at least one of illumination from headlights towards a place where the moving object is present and an increase in an amount of light from the headlights.

6. The driving assistance device according to claim 1, wherein the second information acquisition unit is configured to acquire the second movement information from the external device via wireless communication.

* * * * *